(12) United States Patent
Bhargava

(10) Patent No.: US 8,109,464 B2
(45) Date of Patent: *Feb. 7, 2012

(54) AIRCRAFT TAXIING AND SECONDARY PROPULSION SYSTEM

(75) Inventor: Brij B. Bhargava, Santa Barbara, CA (US)

(73) Assignee: The Ashman Group, LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/157,239

(22) Filed: Jun. 9, 2011

(65) Prior Publication Data

US 2012/0006935 A1   Jan. 12, 2012

Related U.S. Application Data

(63) Continuation-in-part of application No. 12/399,854, filed on Mar. 6, 2009, now Pat. No. 7,980,509, and a continuation-in-part of application No. 12/137,789, filed on Jun. 12, 2008, now abandoned, which is a continuation-in-part of application No. 11/683,711, filed on Mar. 8, 2007, now abandoned.

(51) Int. Cl.
*B64C 15/00* (2006.01)
*B64D 41/00* (2006.01)
(52) U.S. Cl. .................. 244/63; 244/50; 244/58
(58) Field of Classification Search ............ 244/50, 244/58, 55, 1 N, 12.5, 63; 701/15
See application file for complete search history.

(56) References Cited

U.S. PATENT DOCUMENTS

| | | |
|---|---|---|
| 3,034,748 A | 5/1962 | Koup |
| 3,489,377 A | 1/1970 | Pearson et al. |
| 3,568,958 A | 3/1971 | Bhore |
| 3,762,670 A | 10/1973 | Chillson |
| 3,807,664 A | 4/1974 | Kelly et al. |

(Continued)

FOREIGN PATENT DOCUMENTS

EP   1785614 A2   5/2007

(Continued)

OTHER PUBLICATIONS

Non-Final Office Action mailed Jul. 21, 2008, U.S. Appl. No. 11/683,711.

(Continued)

*Primary Examiner* — Tien Dinh
*Assistant Examiner* — Richard R Green
(74) *Attorney, Agent, or Firm* — Koppel, Patrick, Haybl & Philpott; Michael J. Ram

(57) ABSTRACT

An on board secondary propulsion system for an aircraft provides the capability of taxiing the aircraft on the ground without using the main aircraft engine(s). The power system includes a small taxi engine mounted on or in the aircraft at a location suitable to provide a thrust sufficient only to taxi the aircraft. Such a suitable system may be provided as original equipment to an aircraft or retrofitted to existing aircraft. The on board secondary propulsion system, in addition to the taxiing function, can provide electrical power, an environmental control unit, power for the aircraft hydraulic system and an emergency power unit as desired. The system can also be used to supplement the main aircraft engines as necessary during takeoff and climb to further reduce fuel consumption, noise, engine emissions, maintenance costs and extend the life of the main aircraft engines, reduce the required takeoff distance of an aircraft when used in conjunction with the main engines and provide emergency glide support.

25 Claims, 9 Drawing Sheets

U.S. PATENT DOCUMENTS

| | | | |
|---|---|---|---|
| 4,091,613 | A | 5/1978 | Young |
| 4,456,204 | A | 6/1984 | Hapke |
| 4,541,237 | A | 9/1985 | Dickey |
| 4,659,039 | A | 4/1987 | Valdes |
| 4,684,081 | A | 8/1987 | Cronin |
| 5,235,812 | A | 8/1993 | Klaass et al. |
| 5,271,295 | A | 12/1993 | Marnot |
| 5,309,029 | A | 5/1994 | Gregory et al. |
| 5,408,821 | A | 4/1995 | Romero et al. |
| 5,480,107 | A | 1/1996 | Bacon |
| 5,490,645 | A | 2/1996 | Woodhouse |
| 5,529,263 | A | 6/1996 | Rudolph |
| 5,687,907 | A | 11/1997 | Holden |
| 5,813,630 | A | 9/1998 | Williams |
| 5,855,340 | A | 1/1999 | Bacon |
| 6,247,668 | B1 | 6/2001 | Reysa et al. |
| 7,225,607 | B2 | 6/2007 | Trumper et al. |
| 7,226,018 | B2 | 6/2007 | Sullivan |
| 7,237,748 | B2 | 7/2007 | Sullivan |
| 2005/0178890 | A1 | 8/2005 | Bacon |
| 2005/0224642 | A1 | 10/2005 | Sullivan |
| 2006/0138278 | A1 | 6/2006 | Gans |
| 2008/0099599 | A1 | 5/2008 | Hutterer |

FOREIGN PATENT DOCUMENTS

| | | |
|---|---|---|
| GB | 764684 | 1/1957 |
| GB | 2422643 | 4/2007 |
| WO | WO95/29094 | 11/1995 |
| WO | WO2006/138267 | 12/2006 |
| WO | WO2008/108933 A1 | 9/2008 |

OTHER PUBLICATIONS

Internal-combustion engine (2008). In Encyclopedia Britannica. Retrieved Jul. 17, 2008 from Encyclopaedia Britannica Online: http://www.britannica.com/EBchecked/topic/290504/internal-combustion-engine.

Response dated Sep. 9, 2008 to non-final Office Action mailed Jul. 21, 2008, U.S. Appl. No. 11/683,711.

Supplemental Response dated Sep. 17, 2008, U.S. Appl. No. 11/683,711.

Final Rejection mailed Oct. 17, 2008, U.S. Appl. No. 11/683,711.

Auxiliary Power Units, NASA Internet document from NASA webpage, dated Jan. 4, 2006 http://web.archive.org/web/200601002432/http://spaceflight.nasa.gov/shuttle/reference/shutref/orbiter/apu/accessed online through web archive on Oct. 2, 2008.

Auxiliary Power Unit, Wikipedia article dated May 7, 2005 http://web.archive.org/web/20050507010530/http://en.wikipedia.org/wiki/AuxiliarLPower_unit accessed online through web archive on Oct. 3, 2008.

Response dated Nov. 19, 2008 to final Office Action, U.S. Appl. No. 11/683,711.

Non-Final Office Action mailed Dec. 15, 2008, U.S. Appl. No. 11/683,711.

Non-Final Office Action mailed May 28, 2009, U.S. Appl. No. 12/137,789.

Response Jul. 29, 2009 to non-Final Office Action, U.S. Appl. No. 12/137,789.

Final Rejection mailed Oct. 1, 2009, U.S. Appl. No. 12/137,789.

International Search Report and Written Opinion of International Application No. PCT/US2009/003525 mailed Oct. 15, 2009.

Response dated Dec. 23, 2009 to Final Office Action, U.S. Appl. No. 12/137,789.

Non-Final Rejection mailed Aug. 4, 2010, U.S. Appl. No. 12/137,789.

James et al., "Derated Climb Performance in Large Civil Aircraft", Rolls-Royce, 2005 Performance and Flight Operations Engineering Conference Article 6, pp. 6.1-6.14.

Response dated Jan. 4, 2011 to non-final Office Action, U.S. Appl. No. 12/137,789.

Final Rejection mailed Jan. 25, 2011, U.S. Appl. No. 12/137,789.

Rolling resistance, (Dec. 3, 2010), in Wikipedia, The Free Encyclopedia, Retrieved 22:52, Jan. 21, 2011, from http://en.wikipedia.org/w/index.php?title=Rolling_resistance&oldid=400277728.

Trident with a fourth prong, Dec. 18, 1969, Flight International No. 3171, vol. 96, pp. 952-957.

Non-final rejection mailed Aug. 16, 2010, U.S. Appl. No. 12/399,854.

Response dated Dec. 15, 2010 to non-final rejection, U.S. Appl. No. 12/399,854 with two Affidavit attachments.

Final rejection mailed Feb. 4, 2011, U.S. Appl. No. 12/399,854.

Response dated May 4, 2011 to Final Office Action with Declaration of W. James Renton, U.S. Appl. No. 12/399,854.

Notice of Allowance dated May 19, 2011, U.S. Appl. No. 12/399,854.

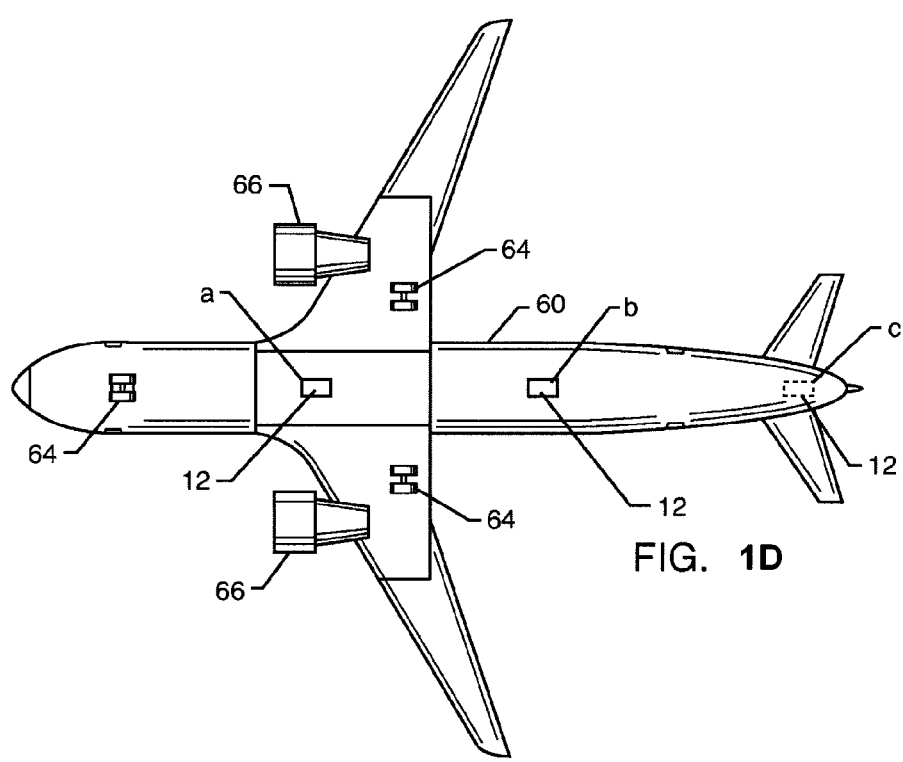
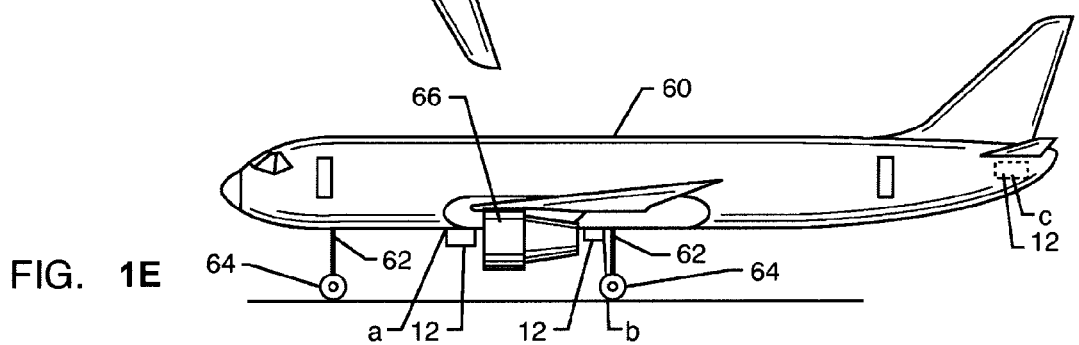
FIG. 1D
FIG. 1E

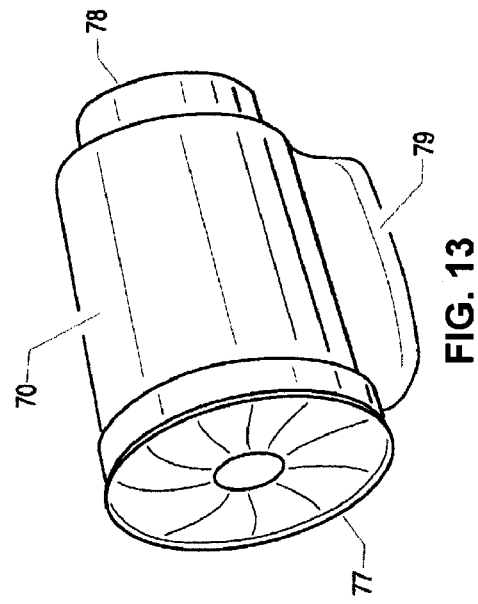
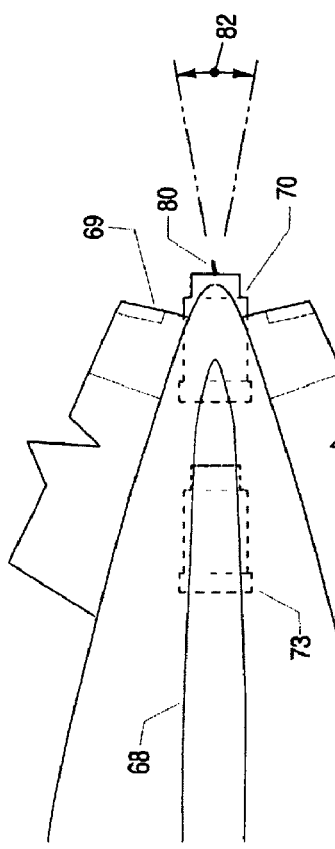
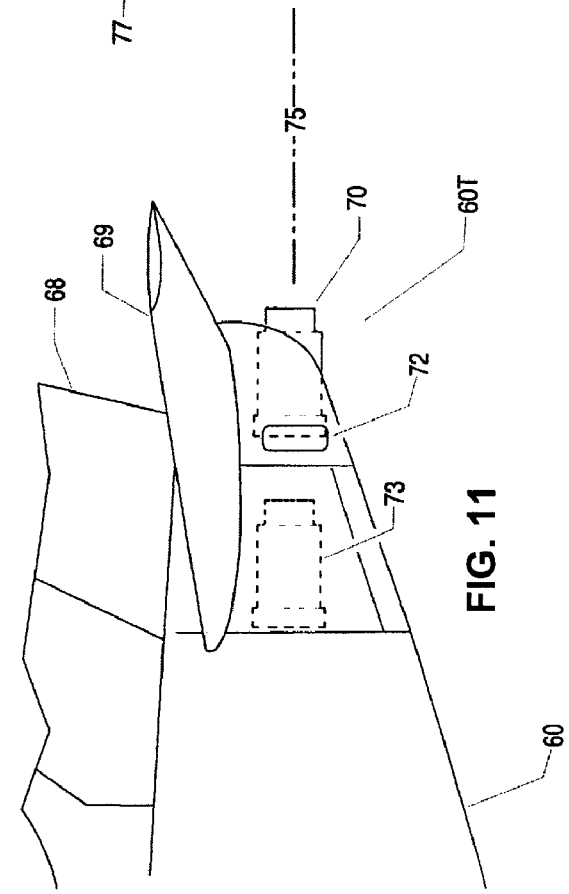
FIG. 13
FIG. 12
FIG. 11

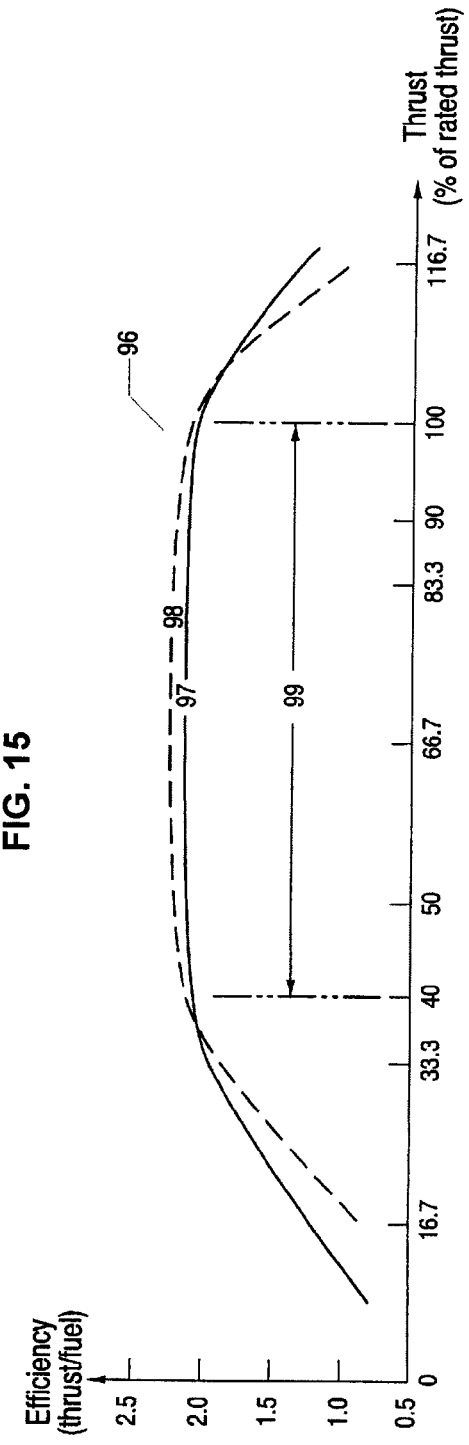

| Aircraft | Engine Type | Aircraft Takeoff Weight (pounds) | Number of Engines | Takeoff Thrust (each engine) (pounds) | Cruise Thrust (each engine) (pounds) | Taxi Thrust (initiation) (pounds) | Weight (each engine) (pounds) |
|---|---|---|---|---|---|---|---|
| Boeing 737-300 | Flight | 125,000 - 140,000 | 2 | 20,000 - 22,000 | 4,600-5,100 | | 4,300 |
| | Taxi | | 1 | | | 3,000 | 600 |

FIG. 14

| Flight Engine Weight | Taxi Engine Weight | Weight Percentage | Flight Engine Takeoff Thrust | Taxi Engine Initiation Thrust | Thrust Percentage |
|---|---|---|---|---|---|
| 8600 | 600 | 7.0% | 40,000 | 3,000 | 7.5% |

AIRCRAFT TAXIING AND SECONDARY PROPULSION SYSTEM

CROSS REFERENCES TO RELATED APPLICATIONS

This application is a Continuation-In-Part of application Ser. Nos. 12/399,854, filed Mar. 6, 2009, now U.S. Pat. No. 7,980,509, and 12/137,789, filed Jun. 12, 2008 now abandoned, which is a Continuation-In-Part of application Ser. No. 11/683,711, filed Mar. 8, 2007 now abandoned, and incorporates Disclosure Document No. 597568, entitled "Auxiliary Power System For An Aircraft," filed Mar. 17, 2006, by reference in its entirety.

BACKGROUND OF THE INVENTION

1. Field of the Invention

The present disclosure relates generally to commercial aircraft, particularly passenger aircraft and, more particularly, to aircraft taxiing and auxiliary or secondary power systems for aircraft. In particular, the present disclosure relates to a secondary on board propulsion system that provides the capability of taxiing an aircraft without having to start or use the main aircraft engine(s). This taxi engine also functions as an APU and can provide thrust so that main engines can operate at less than rated thrust during takeoff and initial climb.

2. Description of the Related Art

In modern aircraft and particularly passenger aircraft, weight, space, and costs are exceedingly important. It is known that up to 15% of the costs, and more recently due to increased fuel costs probably more than 15% of the costs, to operate a passenger aircraft are typically spent while the aircraft is on the ground. A significant portion of these costs are for taxiing between airport locations (e.g., gate, hangar, maintenance areas and runway) with power typically supplied by the aircraft's flight engines.

When flight engines are used for taxiing, they operate in a very inefficient region of their rated thrust and, accordingly, consume substantial quantities of fuel for each minute spent in this operational mode. The resultant fuel costs can be especially substantial at busy airports where aircraft frequently spend extended times between a gate and the runways with the flight engine(s) running. In addition, significant brake maintenance costs are incurred. When the flight engines are used for taxiing, the brakes must be frequently engaged to counter the high thrust of these engines. This significantly increases the frequency of brake repair and adjustment.

Many passenger aircraft also include separate power systems that provide a number of ground services (e.g., cooling, heating, lighting, power for hydraulics, engine start, ground system checkout, and emergency power). These additional systems are often referred to as auxiliary power units (APU) and emergency power units (EPU). Because they add weight to the aircraft, they are another source of added fuel costs.

Any reduction in parts, weight and complexity in aircraft systems is highly desirable. System reliability and maintainability are also important issues, since they impact the availability of an aircraft and its overall costs. Thus, a reduction in parts, weight and complexity in such systems is considered highly desirable. Reliability and maintainability of aircraft systems are also very important issues, since they impact the availability of the aircraft and overall costs.

Auxiliary power systems have been integrated into aircraft to meet the aforementioned requirements. The integration of an auxiliary power unit (APU), emergency power unit (EPU), environmental control system (ECS) and engine start system (ESS) with reduced weight and size are known and are disclosed in a number of United States patents, such as U.S. Pat. No. 4,684,081 (Cronin), U.S. Pat. No. 5,235,812 (Klaass et al.), U.S. Pat. No. 5,309,029 (Gregory et al.), U.S. Pat. No. 5,408,821 (Romero et al.), and U.S. Pat. No. 5,490,645 (Woodhouse). Such systems include the capabilities of providing power for ground check-out, ground cooling, main engine start, flight cooling, and emergency engine start. However, these existing on board power systems, while providing many essential functions, do not provide the capability of taxiing the aircraft on the ground between the gate, hangar, or maintenance area to the runway and back without having to use the main engine(s).

SUMMARY

The availability of a separate engine, preferably a small thrust engine specifically designed to have a rated thrust limited to the thrust required to move the aircraft on the ground, the thrust then being reduced to efficiently provide sustained ground movement without the necessity to countervail the thrust using the aircraft breaking system, will thus fill a substantial unfulfilled need of aircraft suppliers and air transport services. Such a power system, referred to herein as a taxi engine, or alternatively as a secondary propulsion system, would provide distinctive advantages to the aircraft owner and an airport, such as reduced fuel consumption, lowered emissions, lower noise levels, lower maintenance, and less wear (and thus longer useful life) of the main engine(s). Until recently, the cost of fuel was not a significant factor; today, however, operators are very concerned about fuel costs, as they have risen dramatically. Similarly, emissions and noise levels, until recently, were not as great a concern as they are today. The need for such a system is especially great at busy airports where aircraft frequently spend extended times at a gate or on the tarmac with its main engine(s) running.

A secondary propulsion system incorporating features of the present invention can also be used in conjunction with the main aircraft engines during takeoff and initial climb to reduce fuel consumption, harmful emissions, noise, and maintenance costs and extend the life of the main aircraft engines.

A power system incorporating features of the invention, such as the secondary propulsion system described herein providing the capability of taxiing an aircraft without using the main aircraft engine(s), is small in size and weight, highly reliable, low cost, requires minimum changes to existing aircraft systems and can also be used for thrust generation during taxiing, takeoff and initial climb, be readily integrated with existing aircraft systems and can make existing on board auxiliary power systems unnecessary or redundant. Such a system would also help to offset the low utilization factor problems of conventional auxiliary power and emergency power units. Additionally, such a system could provide redundancy and/or additional power to the aircraft if necessary such as in an emergency.

Such a system, while providing significant advantages for flights of any duration is also particularly advantageous for short duration flights, as it provides significant fuel savings. As an added feature, the on board secondary propulsion system for taxiing an aircraft without having to use the main engine(s) can be easily retrofitted to an existing aircraft or be integrated with the systems as part of the construction of a new aircraft. Because such a system also can provide additional takeoff thrust, it reduces the length of the runways required for takeoff of aircraft as well as aircraft climb times.

Such a system used in conjunction with the main aircraft engines operated at a less than rated thrust provides secondary propulsion and supplement the thrust required during takeoff and climb further reduces fuel consumption, noise, and harmful emissions, while extending the life of the main aircraft engines.

A first embodiment of a taxi engine/secondary propulsion system incorporating features of the present invention includes a control system and control panel in the aircraft for providing starting power to the taxi engine, and can also provide primary and emergency power to the aircraft. The taxi engine according to a first embodiment of the invention is preferably a small turbine engine. The small turbine engine can be installed on an existing aircraft at several convenient locations to provide sufficient thrust to drive the aircraft for taxiing, the engine being mounted such that it would not affect the aerodynamic performance of the aircraft. It can be mounted on a retractable system similar to that used for landing gear. Such an engine is light weight, highly reliable, and can be modified and made adaptable to existing aircraft, or be provided as standard equipment on new aircraft.

In a second embodiment a small turbine engine, mounted on any convenient location on the aircraft, includes a high speed starter/generator on a high speed power shaft. The engine is mounted such that it would not affect the aerodynamic performance of the aircraft. It also can be mounted on a retractable system similar to that used for landing gear. The starter/generator can also be used in conjunction with a conventional environmental control unit. This embodiment can replace the conventional auxiliary aircraft power units such as disclosed in Cronin, Klaass et al., Gregory et al., Romero et al., and Woodhouse, by providing all or any combinations of the same functions that those units provide. Additionally, such a system can be integrated to supplement and/or provide additional electrical power or designed to provide added redundancy if necessary.

Any of these embodiments of the on board taxi engine, secondary propulsion system can be used during taxiing without use of the main engines and, in conjunction with the main aircraft engines, during takeoff to beneficially provide reduced fuel consumption, lowered emissions, less noise, increased operating life of the main aircraft engines, and reducing maintenance costs for the aircraft.

Further objects and advantages of the taxi engine will become more apparent from the following description of the embodiments described herein, which, taken in conjunction with the accompanying drawings, will illustrate, by way of example, the principles of the invention.

BRIEF DESCRIPTION OF THE DRAWINGS

The foregoing and other aspects and advantages will be better understood from the following detailed description of the embodiments of the invention with reference to the drawings in which:

FIG. 1D shows a bottom view of an aircraft illustrating additional alternative locations for the taxi engine.

FIG. 1E shows a side view of an aircraft of FIG. 1D.

FIG. 11 is an enlarged side view showing structure within the circled portion of FIG. 10.

FIG. 12 is a top view of the aircraft portion shown in FIG. 11.

FIG. 13 is a perspective view of a taxi engine incorporating features of the invention such incorporated within the aircraft portion shown in FIGS. 11 and 12.

FIGS. 14 and 15 are tables listing exemplary parameters for flight and taxi engines.

FIG. 16 is a graph illustrating typical engine efficiency as a function of rated thrust.

DETAILED DESCRIPTION OF THE INVENTION

Figure 1A:
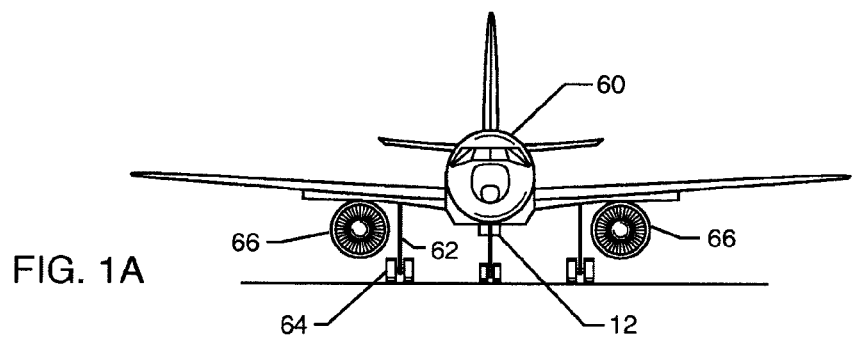
FIG. 1A is a front view of an aircraft illustrating a first location of an on board taxi engine incorporating features of the present invention.
Figure 1B:
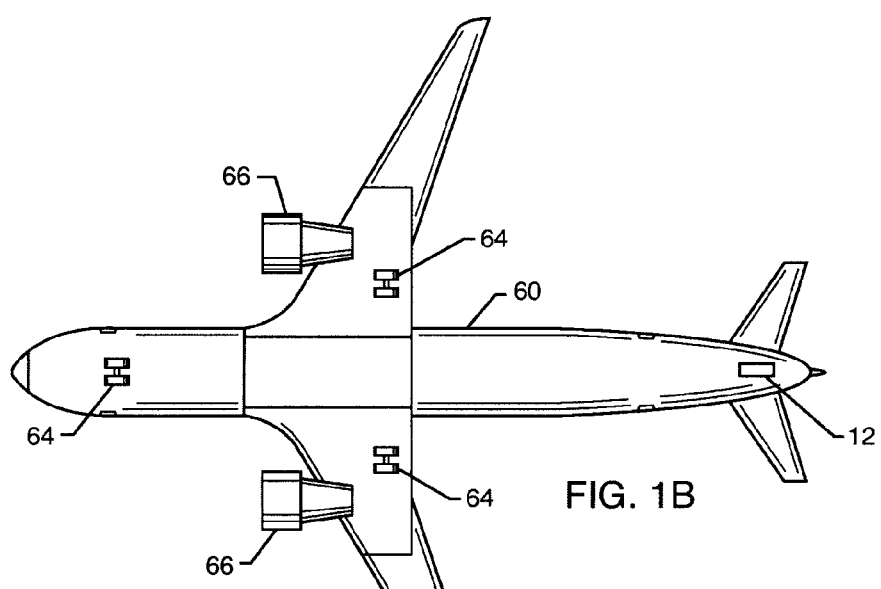
FIG. 1B is a bottom view of an aircraft illustrating a second location of an on board taxi engine incorporating features of the present invention.
Figure 1C:
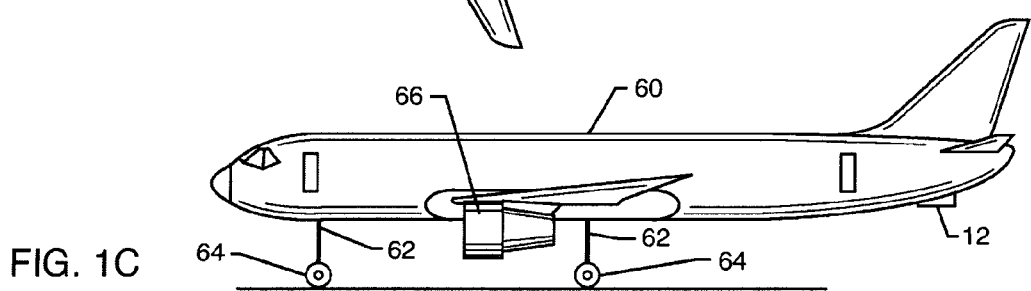
FIG. 1C is a side view of an aircraft shown in FIG. 1B.

In the following description of the invention, reference is made to the accompanying drawings, which form a part thereof, and in which are shown, by way of illustration, exemplary embodiments illustrating the principles of the taxi engine and secondary propulsion system of the present invention and how it is utilized. It is to be understood that, based on the teachings herein, other embodiments can be used and structural and functional changes can be made thereto without departing from the scope of the present invention.

In the discussion that follows, several terms and phrases will be used to define particular aspects of aircraft maneuvers and performance. While these terms may be generally used in the aircraft industry, it is important to understand the context in which the terminology is being used in relation to the particular embodiments of the present invention.

Taxiing refers to movement of the aircraft on the ground and/or tarmac prior to takeoff and after landing but does not include acceleration to takeoff and landing.

At any airport or other facility where aircraft take off and land, a variety of parameters directly affect decisions relating to the level of thrust power being provided by a taxi engine or secondary propulsion system and the main aircraft engines. On board computer systems take into account the height of surrounding buildings and other infrastructure, topographical features, elevation, temperature, relative humidity, and other environmental factors (rain, ice, snow, etc.), aircraft load, runway length, wind direction and wind velocity, etc., to determine the optimal settings for the secondary propulsion system and the main aircraft engines. It should be understood that aircraft maneuvers such as 1) Initial Climb; 2) Reduced Power Climb; and 3) Steady Climb, defined below, will vary with these parameters and the commands sent by the on board computer systems to the aircraft systems.

As used herein, the phrase "Initial Climb" refers to the climbing movement of the aircraft from the time the aircraft wheels leave the runway to the point at which the aircraft has cleared the buildings, infrastructure, and geographical features in the area from which the aircraft has taken off. The height above runway level at which Initial Climb is completed will vary with local features and parameters described earlier. Initial Climb may be completed a few hundred feet above runway level or may require upwards of one thousand feet.

"Reduced Power Climb," as used herein, refers to the climbing movement of the aircraft from the end of Initial Climb. While the height above runway level to the start of Reduced Power Climb varies, as discussed previously, and the height above runway level at which Reduced Power Climb ends also varies depending on local features and other parameters, as described earlier, a good rule of thumb is that Reduced Power Climb ends at a height above the runway of about 3,000 feet.

As used herein, "Steady Climb" refers to the climbing movement of the aircraft from the point at which the taxi engine is shut off and the main engines, operating at less than full thrust, are able to maintain a safe, positive rate of climb.

Aircraft taxiing systems of the present disclosure provide substantial advantages to an aircraft owner in the form of, for example, reduced fuel consumption, lowered emissions, lower noise levels, lower maintenance, and less wear (and thus longer useful life) of the flight engine(s) when compared to using only the flight engines for ground movement or at rated thrust for takeoff. There is also less wear and longer useful life of the aircraft brakes since they do not have to oppose the high thrust of the flight engines when used for taxiing.

These taxiing systems are small in size and weight, highly reliable, and low cost. They require minimum changes to existing aircraft systems, are usable for power generation on the ground and during flight (rather than being just additional dead weight) and can be readily integrated with existing aircraft systems. In addition, they make existing on board auxiliary power systems unnecessary or redundant The taxi engines incorporating features of the invention are preferably small gas turbine engines that are configured to operate at an efficient thrust level which is less than 33% of the main engine rated thrust. It should be noted that idle thrust can be less than 33% of rated thrust but this is outside the efficient operating range (see FIG. 16). This is in marked contrast to aircraft that presently use their flight engines for taxiing purposes. When flight engines are used for taxiing, they are operated in a region far below 33% of their rated thrust thus operating in a highly inefficient manner. Even at or near their idle speed, the flight engines generate far more thrust than that required for taxiing. In contrast, the taxi engines have a rated thrust which is less than 33% of the rated thrust of the one or more main engines and therefore the taxi engine is specifically designed to operate efficiently at or below its rated thrust to thereby reduce fuel consumption and operating costs.

In an extreme emergency condition (e.g., when the aircraft's flight engines fail or are running out of fuel), these taxiing systems can provide a glide thrust sufficient to facilitate the aircraft's safe descent along a glide path. Additionally, they can provide redundancy and/or additional power to aircraft when necessary to enhance aircraft reliability. They can be integrated with the systems of new aircraft and, when retrofitted into existing aircraft, they can replace the non-flight engines (e.g., auxiliary power units) so that the aircraft's weight is substantially unchanged. In the latter case, these systems reduce the low utilization factor problems of existing auxiliary power and emergency power units used in commercial aviation.

A secondary propulsion system 10, 110 incorporating features of the present invention is disclosed in several embodiments. The secondary propulsion system taxi engine 12 can be located on an aircraft 60 in various locations on the aircraft, as illustrated in FIGS. 1A-1E. The taxi engine 12 is mounted such that it would not affect the aerodynamic performance of the aircraft. It can be mounted on a retractable system similar to that used for landing gear. A preferred location is near the tail of the aircraft adjacent an existing APU or in the tail portion of the fuselage in place of the APU. The primary purpose of the taxi engine 12 according to the present invention is to provide taxiing of the aircraft 60 without having to operate the main aircraft engine(s) 66. A secondary purpose is to assist the main engines during takeoff and climbing of the aircraft.

Figure 2:
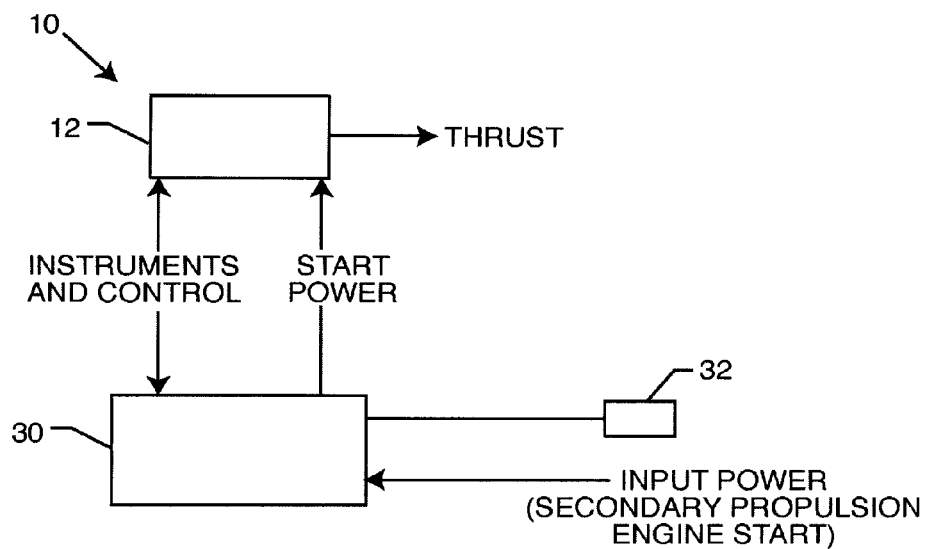
FIG. 2 is a schematic diagram illustrating a first embodiment of an on board secondary propulsion system incorporating features of the present invention.

FIG. 2 schematically illustrates a first embodiment of a secondary propulsion system 10 in accordance with the present invention. System 10 includes a taxi engine 12, which can be a turbine engine, for example, which provides output power for taxiing aircraft 60 without having to start the main flight engine(s) 66 of the aircraft.

In particular, a taxi system embodiment may be located on an aircraft 60 in various locations as illustrated in FIGS. 1A-1E. One location is on one of the landing gear 62 which included wheels 64. The system provides taxiing of the aircraft 60 without having to operate the aircraft flight engine(s) 66.

Figure 3:
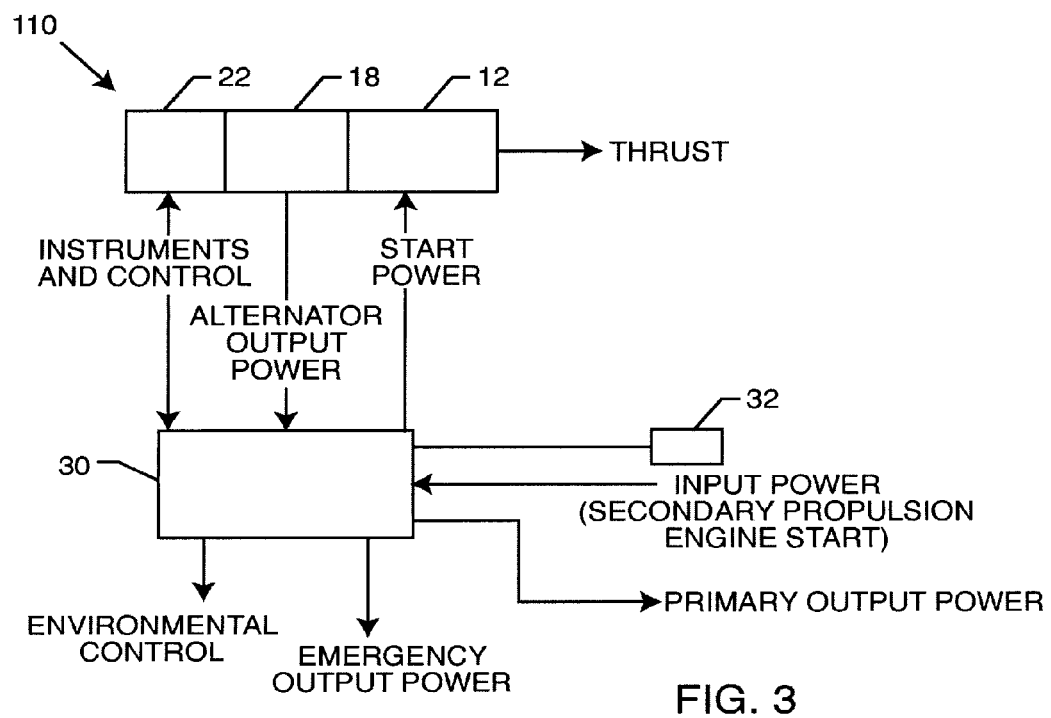
FIG. 3 is a schematic diagram illustrating a second embodiment of an on board secondary propulsion system incorporating features of the present invention.

FIG. 3 schematically illustrates an embodiment of the secondary propulsion system 110. Such a power system can be located at a similar location or locations on aircraft 60 as would the power system of the first embodiment of the invention.

In this embodiment of the invention, secondary propulsion system 110 includes taxi engine 12, which is designed to have a high speed power shaft (not shown). A high-speed alternator 18 would be mounted on the high-speed power shaft. Alternator 18, as is well known in the art, may also act as a starter/generator. Alternator 18 may be used in conjunction with an environmental control unit (ECU) 22, which provides conditioned air where required in various compartments of the aircraft.

Taxi engine 12 is in communication with a control system 30, which also includes control panel 32 having the appropriate instrumentation, controls, indicator lights, and switches typical of such systems. Such control systems are well known and quite common to those having skill in the art and the details of such a control system need not be discussed here. Also, the design of turbine engines, APU's, EPU's, ECS's, ESS's, gearboxes and engine mounting structures are well-known and quite common to those having skill in the art and the details of such systems, equipment and structures need not be discussed here. In this embodiment of the invention, control system 30 provides starting power to taxi engine 12, and subsequently, primary output power and emergency output power to aircraft 60. This alternative embodiment of the secondary propulsion system 110 may be retrofitted to existing aircraft to provide sufficient thrust power to provide taxiing capability.

Figure 4:
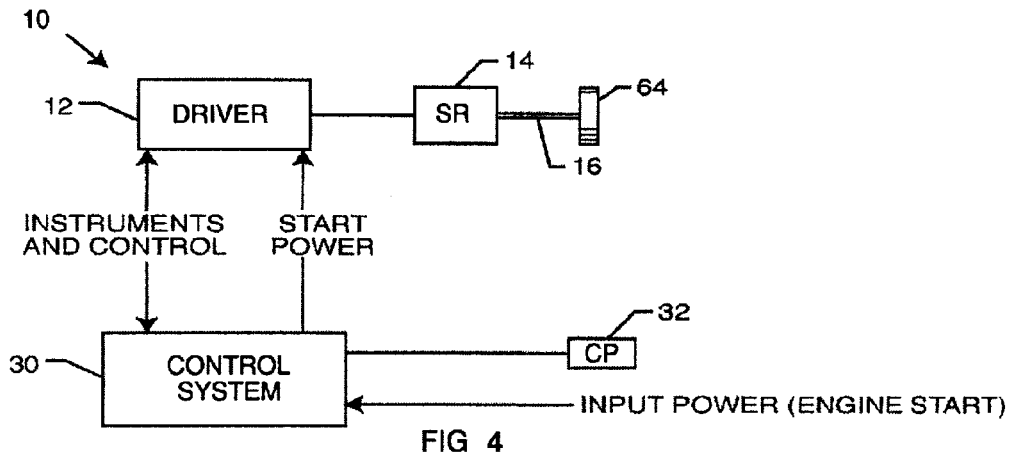
FIGS. 4 and 5, which are similar to FIGS. 2 and 3, are block diagrams of the taxiing engine coupled to a landing wheel of the aircraft of FIG. 1A.

FIG. 4 schematically illustrates an embodiment of the taxi system of FIGS. 1A-1E. The system 10 includes a taxi engine 12 which can be, for example, an internal combustion engine or a turbine engine that is connected to a speed reducer (SR) 14, such a gearbox. An output shaft 16 of the speed reducer 14 is mechanically linked to power the wheels 64 of one of the aircraft landing gear to, thereby, provide taxi power directly to the wheels for taxiing the aircraft without having to start the flight engine(s) 66.

The secondary propulsion system taxi engine provides taxiing capability while being small in size and weight, highly efficient, highly reliable, low cost, low in fuel consumption, lower in emissions to the environment and low in maintenance. Such a system, retrofitted to an existing aircraft, requires minimal changes to existing aircraft systems or be provided as standard equipment on new aircraft.

The taxi engine 12 is in electronic communication with a control system 30, which also includes a control panel 32 that has typical control structures (e.g., instrumentation, displays, controls, indicator lights, batteries, switches and associated software). Such control systems are well-known in the aircraft art as are, also, the design of turbine engines, auxiliary power units (APU's), emergency power units (EPU's), and environmental control systems (ECS's). Gearboxes and engine mounting structures are also well-known and quite common to those having skill in the art and, accordingly, the details of such systems, equipment and structures need not be discussed here.

In a preferred embodiment of the disclosure, a control system 30 provides starting power to taxi engine 12 as well as primary output power and emergency output power to the aircraft. The taxi engine 12 can be retrofitted to existing aircraft to provide sufficient shaft horsepower directly to the wheels 64 to provide taxiing capability.

The taxi engine 12 can be a small turbine engine that produces power sufficient, at rated thrust, to provide taxiing capability. Such an engine is highly reliable and would add no more than about 400 pounds to the aircraft weight.

Such a system, retrofitted to an existing aircraft, would require minimal changes to existing aircraft systems. Such a system could also be provided as standard equipment on new aircraft. Alternatively, taxi engine 12 can be a small piston engine of approximately 150 hp to 400 hp, depending on the size and weight of the aircraft, which also adds less than 400 pounds in weight. Such qualified engines for aerospace applications are generally highly reliable and would need very minor modifications to meet the requirements of the auxiliary power system of the present disclosure. Alternatively, taxi engine 12 may also be a small turbine engine that produces sufficient power to directly drive the wheels 64 or a jet thrust to provide taxiing capability. Such an engine is highly reliable and, in combination with a speed reducer, would add only about 160 pounds to the aircraft weight.

Figure 5:
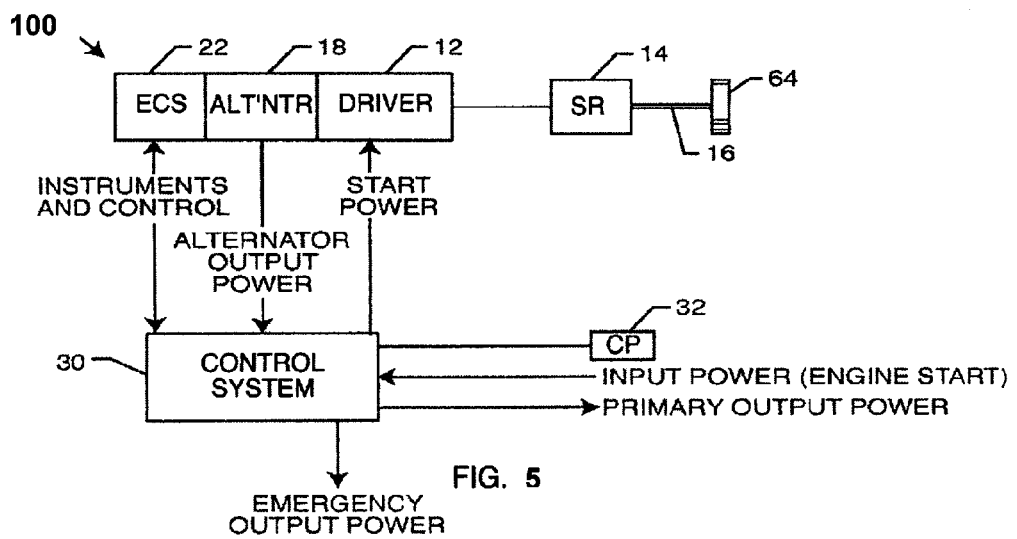

FIG. 5 schematically illustrates a further embodiment. Such a taxi system can be located at a similar location or locations on aircraft 60 as would the taxi system of FIG. 4. In this embodiment, the power system 100 includes taxi engine 12, designed to have a high speed power shaft (not shown) and a low speed geared power shaft (not shown). A high-speed alternator (ALT'NTR) 18 can be mounted on the high speed power shaft. Alternator 18, as is well known in the art, may also act as a starter/generator. A speed reducer 14 is also mounted on taxi engine 12 at the low speed shaft and its output is mechanically linked to power the wheels 64 of aircraft 60. Alternator 18 may be used in conjunction with an ECS 22, which provides conditioned air where required in various compartments of the aircraft.

Taxi engine 12 is in electronic communication with control system 30, which also includes control panel (CP) 32 that includes typical control structures (e.g., instrumentation, displays, controls, indicator lights, batteries, switches and associated software). As described above, such control systems are well known and quite common to those having skill in the art and the details of such a control system need not be discussed here. In this embodiment of the disclosure, control system 30 provides starting power to taxi engine 12, and subsequently, primary output power and emergency output power to aircraft 60.

This alternative embodiment 100 may be retrofitted to existing aircraft to provide sufficient shaft horsepower to the wheels 64 to provide taxiing capability. Accordingly, the aircraft's flight engines need not be started. This embodiment of a power system provides taxiing capability while being small in size and weight, highly efficient, highly reliable, low in cost, low in fuel consumption, lower in emissions to the environment and low in maintenance. Such a system, retrofitted to an existing aircraft, requires minimal changes to existing aircraft systems. Such a system can also be provided as standard equipment on a new aircraft.

Taxi engine 12 may be a piston engine or a modified turbine engine with the alternator 18, such as a high speed alternator, with a desired output, for example, of 30 to 120 kVA. The combination of taxi engine 12, alternator 18, speed reducer 14 (which may be a gear box) for low speed and the associated controls, would likely add less than 600 pounds of weight to the aircraft. Several types of engines currently exist which can be suitably modified for use as a taxi engine 12 to provide a light weight, reliable, low maintenance, low fuel consumption, low noise, low cost, and low emissions system. Such a power system 10 can replace or render unnecessary conventional auxiliary power units, thereby further reducing the total weight and number of parts of the conventional systems in an aircraft. Additionally, such a system could be integrated to supplement and/or provide additional electrical power or designed to provide added redundancy if necessary.

Figure 6:
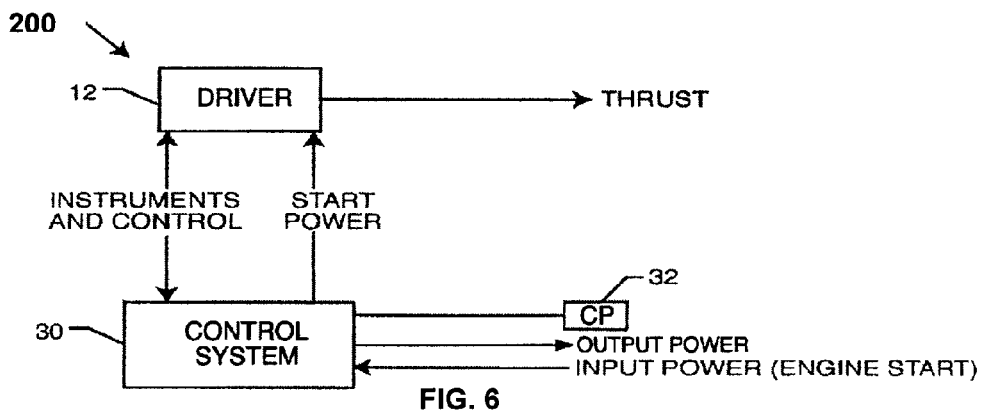
FIG. 6, similar to FIG. 4, is a block diagram of the secondary power system also including power output to other aircraft components.

FIG. 6 schematically illustrates another embodiment 200 for providing taxiing of an aircraft 60, without having to use the aircraft's flight engines. In this embodiment, taxi engine 12 may be mounted to aircraft 60 in any of several convenient locations. Such a power system 200 could be readily retrofitted to existing aircraft and would generate sufficient thrust that would enable the taxi engine 12 to provide taxiing of the aircraft 60 without having to start the flight engines 66 of the aircraft.

Figure 7:
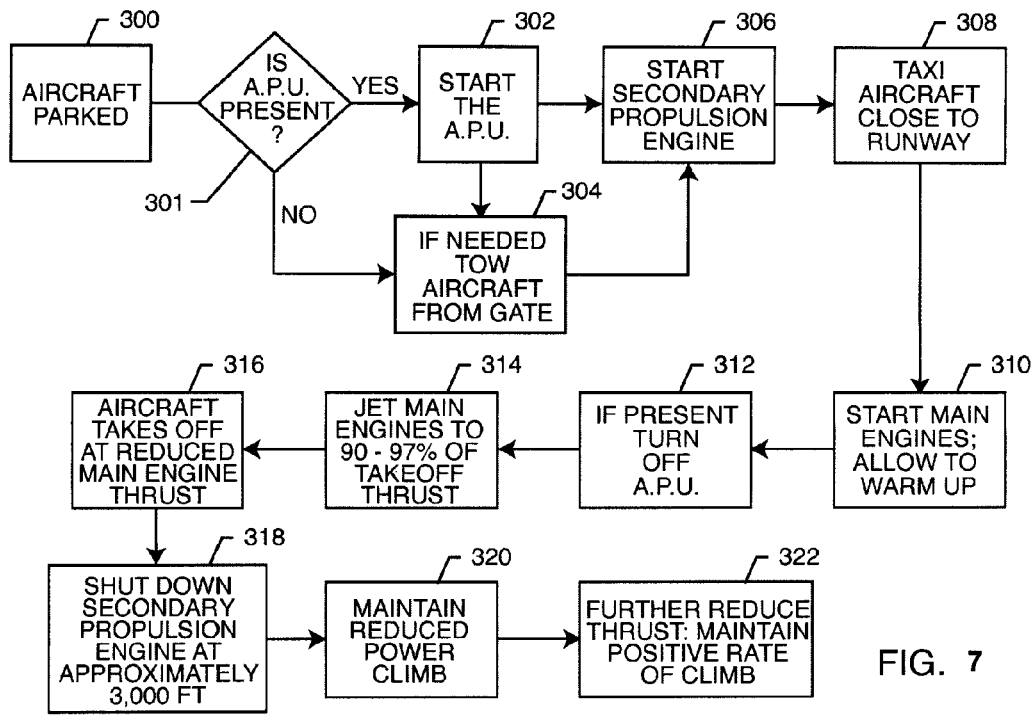
FIG. 7 is a block diagram illustrating the use of an on board secondary propulsion system incorporating features of the present invention to provide taxi thrust on the ground and, in conjunction with the main engines, thrust for takeoff and climb.
Figure 8:
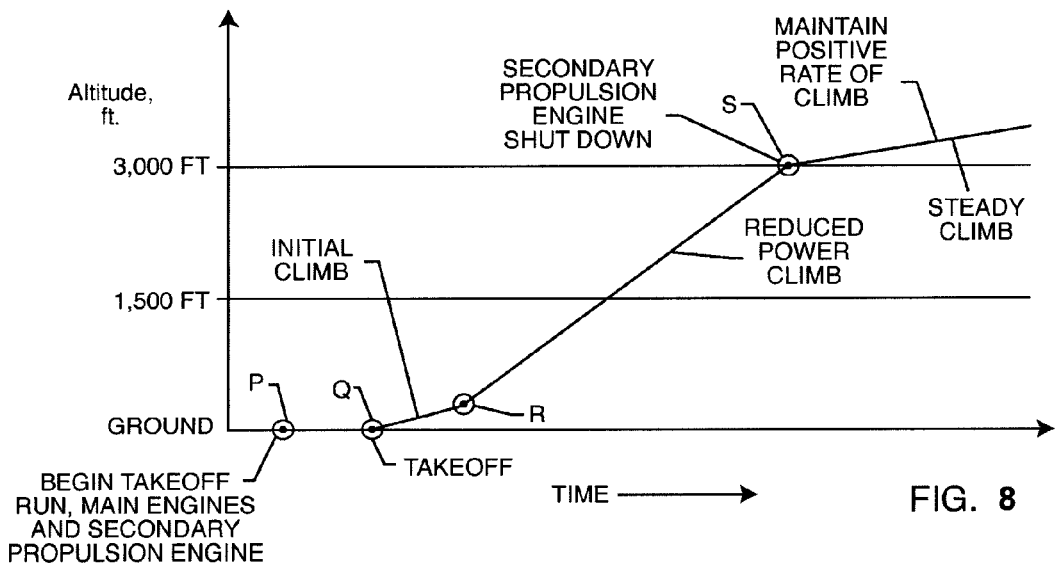
FIG. 8 graphically illustrates use of the combination of main engines and taxi engine during taxiing, takeoff, and climb.

FIGS. 7 and 8 illustrate the steps of the methods by which an on board secondary propulsion system according to any of the embodiments described herein can be used to provide an independent secondary propulsion during taxiing and, during takeoff, and climb in conjunction with the main engines 66 of the aircraft. The use of such a secondary propulsion system provides a number of distinct advantages, as will be discussed.

Referring to FIG. 7, at block 300 the aircraft is parked, generally at the departure gate. At block 301, it is determined if the aircraft has an APU. At block 302, if there is an APU, the APU is started. At block 304, if necessary (it is standard procedure at some facilities), the aircraft is towed away from its parked location to another location. If there is no APU present, the next step is block 304, if necessary, or block 306.

At block 306, the taxi engine 12 is started. At block 308, the aircraft is taxied close to the runway using only taxi engine 12.

At block 310, the main aircraft engines 66 are started and allowed to warm up. At block 312, if appropriate, the APU (if present) is shut off, if it is no longer necessary.

At block 314, the main engines are set below their normal rated thrust for takeoff, which can be from about 90% to about 97% of their normal takeoff thrust. At block 316, the aircraft takes off using the taxi engine 12 in conjunction with the main aircraft engines 66, which are running at takeoff thrust less than rated thrust and the aircraft proceeds through the step of Initial Climb.

At block 318, the aircraft climbs through Reduced Power Climb until the taxi engine is shut down. At block 320, the main aircraft engines 66 are kept at their required reduced thrust levels through Steady Climb until, at block 322, the main aircraft engine thrust levels are further reduced to a level that still allows the aircraft a positive rate of climb.

FIG. 8 graphically illustrates the method just described. Point P is the beginning of the takeoff run, and point Q is the point of takeoff. Prior to point P only the taxi engine 12 is required, usually at less than rated thrust. Between points P and Q, the taxi engine 12 is running at its rated thrust and the main aircraft engines are running at reduced thrust, approximately 90% to 97% of rated thrust. Between point Q and point R, the aircraft moves through its Initial Climb, until the surrounding buildings, infrastructure and topographical features are cleared. Between point R and point S, the aircraft goes through Reduced Power Climb. The main aircraft engines 66 continue to run at their reduced thrust until point S is reached. At that point, the taxi engine 12 is shut off and the thrust of the main aircraft engines 66 is further reduced to a thrust sufficient to still provide the aircraft with a positive rate of climb during Steady Climb.

The combination of the taxi engine 12 operating at rated thrust and the main engines 66 running at reduced thrust for the takeoff and climb procedure just described provides a number of advantages over the conventional use of just the main engines running at full thrust for takeoff and climb. Because the main engines 66 are running at reduced thrust, which may be as low as 90% of maximum (the control system will optimize the setting of main engine thrust), the main engines 66 are running at reduced temperatures, which can significantly lower the formation and emission of $NO_x$ and other harmful emissions. Reducing the thrust at which the main aircraft engines 66 are running by 10%, for example, can reduce the emissions of harmful gases and particulate by as much as 30%. Noise levels are also substantially reduced.

Taxi engine 12 is, for example, a small turbine engine that provides a rated thrust sufficient only to provide ground movement, the taxi thrust depending on the requirements of each particular aircraft. Such a taxi engine 12 in most applications adds minimal weight and can be the lowest cost engine to provide taxiing capability for existing or new aircraft. Taxi engine 12 is in electronic communication with control system 30 which has typical control structures (e.g., instrumentation, displays, controls, indicator lights, batteries, switches and associated software). In the embodiment of FIG. 6, control system 30 also provides starting power to taxi engine 12. Embodiments of the taxi engine 12 (e.g., as illustrated in FIGS. 11-16) are discussed below.

Figure 9:
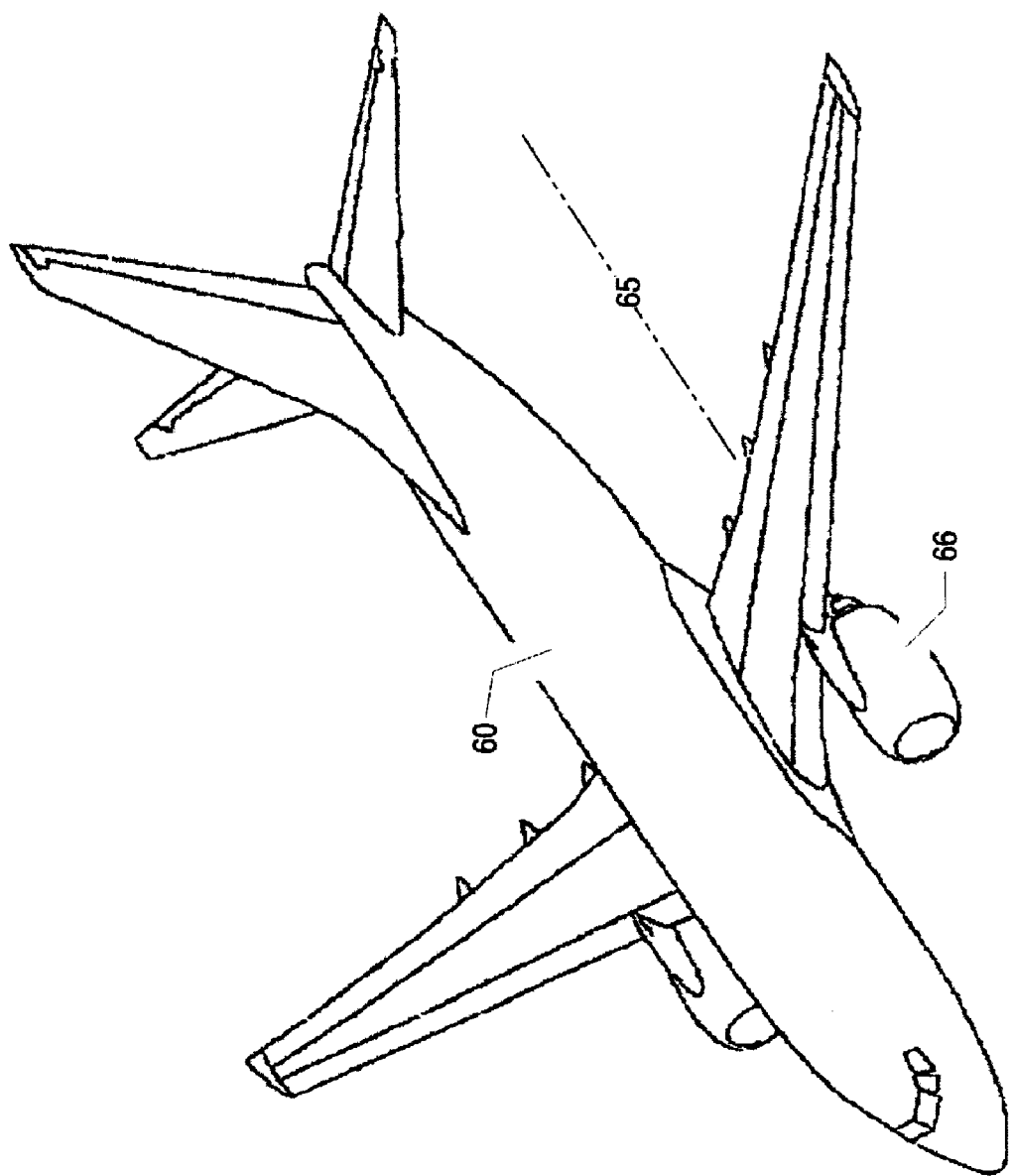
FIG. 9 is a perspective view of an aircraft similar to that of FIGS. 1A-1E during flight.
Figure 10:
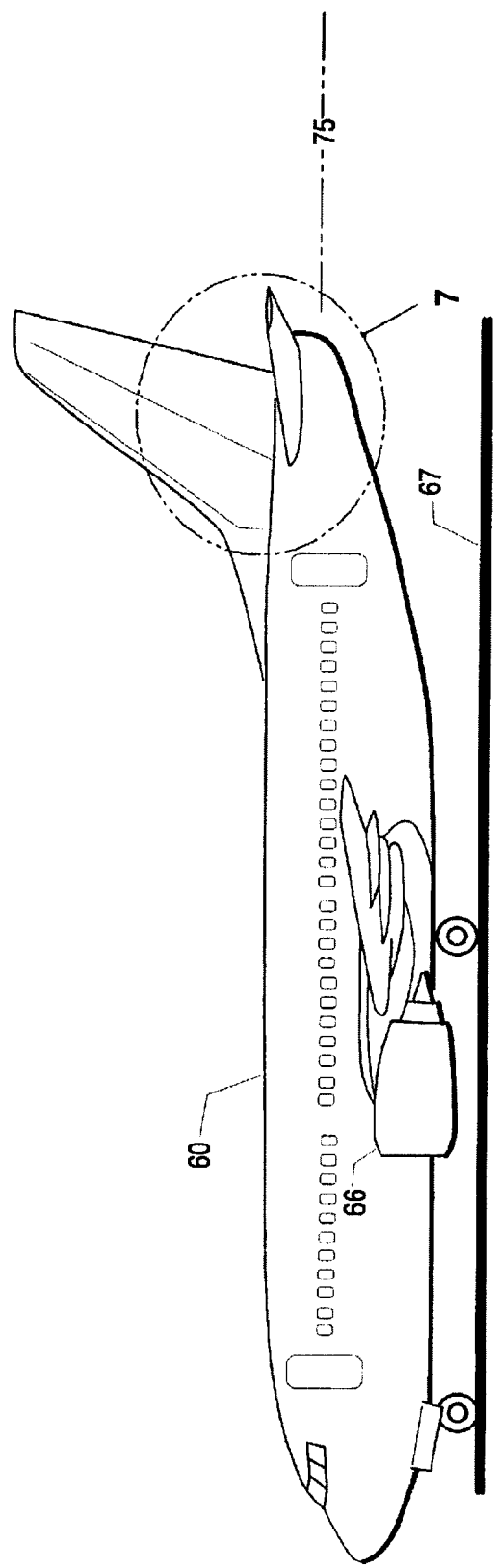
FIG. 10 is side view of the aircraft of FIG. 9 in position to taxi along a taxi surface.

FIG. 9 is an illustration of a passenger aircraft 60 similar to the aircraft of FIGS. 1A-1E. The aircraft 60 is shown in a flight mode in which each of the flight engines 66 is providing a flight thrust 65 in a flight thrust direction, said flight thrust and direction being sufficient for continued flight. FIG. 10 illustrates the aircraft 60 of FIG. 9 in position to taxi along a taxi path 67 which might be, for example, a gate surface, a hangar surface, a maintenance area surface, a runway surface, or a service surface leading to the runway surface, these airport surfaces generically referred to as the tarmac. To facilitate taxiing, the aircraft includes a taxi engine 12 located in an area of the aircraft such as that enclosed by the broken line circle 7 on FIG. 10.

As set forth above, embodiments using the taxi engine 12 are shown in FIGS. 11-16. In particular, FIG. 11 is an enlarged view of the area 7 of FIG. 10 and FIG. 12 is a top view of the structure of FIG. 11. These figures show the tail structure 61 of the airplane 60 which includes a vertical stabilizer 68 and horizontal stabilizers 69. They also illustrate the taxi engine 12 as taxi engine 70 installed in the tail structure 61 of the aircraft 60. The taxi engine 70 is arranged to generate a taxi thrust 75 which is sufficient only to initiate and maintain taxiing of the aircraft along a taxi surface 67.

The taxi engine 70 is preferably a gas turbine engine which draws air into an intake portion and generates an exhaust from an exhaust portion to thereby provide the taxi thrust 75. Preferably, the tail structure 61 is modified to define an intake opening 72 which enhances air flow into the intake of the taxi engine 70. Although the taxi engine 70 is shown in a location in which it partially extends past the aircraft's contour, the engine may be located in other locations. For example, it can be located in a further forward location 73.

As shown in FIG. 12, the taxi engine 70 may include a thrust steering mechanism 80 (e.g., a rotatable vane positioned in the engine's exhaust) which can cause the taxi thrust 75 to be rotated in azimuth over a rotation angle 82 (e.g., a rotation angle on the order of 10%). Although passenger aircraft generally have other guidance means (e.g., a steerable nose wheel) to direct them along a taxi path 67, this embodiment may be useful in enhancing this guidance (particularly, when large aircraft are taxiing in difficult conditions such as windy conditions).

The taxi engine 70 is illustrated in FIG. 13. The engine 70 is preferably a gas turbine engine having an intake structure 77 and an exhaust structure 78. The engine also preferably includes auxiliary structure 79 (e.g., comprising starter, generator, fuel pump, oil pump, gear box, control electronics and associated software) that can provide the functions (e.g., cooling, heating, lighting, power for the aircraft's hydraulic systems, engine start, ground system checkout, and emergency power) of conventional aircraft auxiliary structures (e.g., APU's, EPU's, and ECS's).

The table 90 of FIG. 14 shows that an exemplary passenger aircraft, such as a Boeing 737-300, has a takeoff weight between 125,000 and 140,000 pounds and includes two flight engines (main engines 66) which each weigh on the order of 4300 pounds. Each of these flight engines can generate a takeoff thrust (a rated thrust) between 20,000 and 22,000 pounds (at standard sea level conditions). Once the aircraft is in level cruise conditions, each engine typically generates a cruise thrust between 4,600 and 5,100 pounds.

It has been found (e.g., through taxiing tests with an exemplary passenger aircraft) that an initial thrust level is required to initiate taxiing of the aircraft and that a lesser thrust is required to maintain taxiing. As a result of these taxiing tests, it has been determined that a taxi engine 12 for the Boeing 737-300 aircraft need only generate an initiation thrust (i.e., a rated thrust) on the order of 3000 pounds and may weigh as little as 600 pounds (this initiation thrust is the taxi thrust necessary to initiate taxiing). The taxi thrust and taxi engine 12 weight are shown in the table 90 of FIG. 14 and the results of the taxiing tests are summarized in the table 92 of FIG. 15.

The table 92 shows that the taxi engine 12 weight need only be approximately 7.0% of the weight of the total combined weight of the flight engines and that the taxi engine 12 thrust (thrust 75 in FIGS. 10 and 11) need only be approximately 7.5% of the total combined flight engine 66 takeoff (rated) thrust in the absence of the taxi engine 12. That is, a weight percentage of 7.0% and/or a thrust percentage of 7.5% is sufficient to accomplish taxiing initiation and continued ground movement for passenger aircraft. In order to provide a reasonable operational margin for operating parameters such as environmental conditions (e.g., elevation and temperature), airport conditions (e.g., runway surface variation and runway slope), and equipment variations (e.g., different aircraft models and manufacturers), the weight percentage and thrust percentage might be increased to maximum values of 10% and 15% respectively. These percentages are significantly different than those of current non-flight engines or engines designed specifically as takeoff thrust boosters.

In addition to having a taxi engine 12 thrust that is appropriately scaled to the total flight engine 66 takeoff thrust, an airplane's taxi engine 12 is preferably configured so that its taxi thrust has a preferred relationship to its standard rated thrust so that it also operates with high efficiency. The graph 96 of FIG. 16 is a plot of the efficiency versus thrust for typical gas turbine main engines 66 such as those in the Boeing 737-300. In particular, engine thrust is shown along the horizontal axis of FIG. 16 as a percentage of the engine's standard rated thrust wherein standard rated thrust of an engine is the maximum long-term recommended thrust. A gas turbine engine can exceed its rated thrust but should only do so for limited time periods. Efficiency is shown along the vertical axis wherein efficiency is defined herein as a ratio of pounds of thrust to pounds of fuel consumed each hour.

The plot 97 indicates that gas turbine main flight engines 66 exhibit high efficiency when their thrust is operating between 33% and 100% of their rated thrust. The plot 97 further indicates that the efficiency deteriorates rapidly as the operating thrust is reduced below 33% of the rated thrust and as the operating thrust is increased above 100% of the rated thrust. Large flight engines 66 typically include a large number of low pressure (LP) and high pressure (HP) compressor and turbine stages which help to broaden the efficiency plot. In contrast, the smaller taxi engine 70 of FIGS. 11, 12 and 13 generally has fewer stages and, accordingly, its efficiency plot 98 is narrower than the plot 98 and its lower and upper skirts fall off more rapidly.

The flight engines 66 of a passenger aircraft such as the Boeing 737-300 are preferably configured so that they are generally operating in the region between 33% and 100% of their standard rated thrust and are most efficient when the aircraft's flight engines are operating at their cruise thrust. When these flight engines are used to generate the much lower taxi thrust along the tarmac, they are operating far below 33% of their rated thrust and are thus operating in a highly inefficient manner. On the other hand, the taxi engine has a rated thrust that is appropriate for ground movement, that taxi thrust being less than the thrust of the main engine operating at 33% of its rated thrust.

In contrast, the much smaller taxi engine 70 of FIGS. 11, 12 and 13 is preferably configured with a rated thrust such that it is operating at maximum efficiency when it is generating its taxi thrust. For example, the rated thrust of the taxi engine is preferably chosen so that the taxi thrust of the taxi engine 70 falls in the preferred region 99 of FIG. 16, that is, between 40% and 100% of the taxi engine's rated thrust. When the passenger load is low and/or the fuel load is low, the taxi thrust may need to be towards the low end of the region 99 and when the passenger load is high and/or the fuel load is high, the taxi thrust may need to be towards the high end of this region. When these criteria are met, both the flight and taxi engines will be operating at or near their maximum efficiency and aircraft operating costs will be significantly reduced.

Running the main aircraft engines at lower temperatures reduces stress on engine parts, extends main engine life and reduces the engine operating temperature. A 100° F. reduction in engine temperature can increase the life of the engine by as much as 100% and this lowers the overall cost of maintenance for the aircraft. Running the main engines at less than maximum thrust also reduces the fuel consumption (by as much as 6% during takeoff and Initial Climb), thus lowering overall costs of operation, which can result in an extended range (potential flight distance) of the aircraft.

The foregoing description of exemplary embodiments of the present invention have been presented for purposes of enablement, illustration, and description. They are not intended to be exhaustive of or to limit the present invention to the precise forms discussed. There may be, however, other secondary propulsion systems not specifically described herein, but with which the present invention is applicable. The present invention should therefore not be seen as limited to the particular embodiments described herein; rather, it should be understood that the present invention has wide applicability with respect to the on board secondary propulsion systems for aircraft. Such other configurations can be achieved by those skilled in the art in view of the description herein. Accordingly, the scope of the invention is defined by the following claims.

The embodiments of the disclosure described herein are exemplary and numerous modifications, variations and rearrangements can be readily envisioned to achieve substantially equivalent results, all of which are intended to be embraced within the spirit and scope of the appended claims.

I claim:

1. A method of efficiently operating an aircraft comprising the steps of:
   providing said aircraft with one or more wing-mounted main engines each having a rated thrust wherein all main engines together provide a total rated thrust sufficient for takeoff in a takeoff thrust direction, and
   providing said aircraft with a taxi engine positioned in or on the fuselage of said aircraft;
   said taxi engine having a maximum rated thrust which is less than 15% of the combined total rated thrust of the one or more main engines and wherein the rated thrust of the taxi engine is less than 33% of the total rated thrust of one of the one or more main engines, the thrust of the taxi engine not being required to provide thrust in takeoff or flight;
   providing ground movement of said aircraft using only the taxi engine by directing the thrust of the taxi engine in a taxi thrust direction that is substantially the same as said flight thrust direction to thereby taxi said aircraft along a taxi path,
   powering said aircraft through takeoff from a runway with the thrust of said main engines limited to between 90 and 97% of said rated thrust and the thrust of said taxi engine operated substantially at or less than said taxi engine rated thrust, such combined powering of the one or more main engines and the taxi engine thereby reducing emissions, extending engine life, reducing maintenance cost, and reducing total fuel consumption of said aircraft when compared with said main engines operated without the taxi engine.

2. The method of claim 1, further including the step of turning off said taxi engine when said aircraft reaches an altitude adequate to safely maintain a rate of climb from said runway.

3. The method of claim 2, wherein said altitude is approximately 3000 feet.

4. The method of claim 1, wherein said powering step includes the step of limiting the thrust of said main engines to 90% of said rated thrust.

5. The method of claim 1, wherein said powering step is preceded by a step of taxiing said aircraft between two ground locations using only said taxi engine.

6. The method of claim 1, wherein the weight of said taxi engine is less than about 600 pounds.

7. The method of claim 1, wherein an auxiliary power unit in the tail portion of the aircraft is replaced by the taxi engine.

8. The method of claim 7, wherein said taxi engine additionally provides the functions of said auxiliary power unit system including but not limited to providing ground services for environmental cooling, engine start, powering the aircraft hydraulic systems, ground system check-out, and emergency power.

9. The method of claim 1, wherein said main engines and said taxi engine are turbine engines.

10. The method of claim 1, wherein said taxi thrust is limited to 7.5% of said combined main engine thrust.

11. The method of claim 1, wherein all of said main engines have, in total, a main engine weight, and the taxi engine weight is less than 10% of said main engine weight.

12. The method of claim 1, wherein said taxi engine has a taxi thrust between 40% and 100% of said taxi engine rated thrust.

13. A method of efficiently operating an aircraft which has one or more wing-mounted main engines configured to power said aircraft during takeoff and flight, the method comprising the steps of:
providing a taxi engine having a rated thrust limited to a thrust sufficient to taxi said aircraft on the ground, wherein the rated thrust of the taxi engine is less than 15% of the total combined rated thrust of the one or more flight engines and wherein the rated thrust of the taxi engine is less than 33% of the rated thrust of one of the one or more flight engines, said taxi engine located in or on the tail portion of the fuselage of said aircraft;
using only said taxi engine to taxi said aircraft between two ground locations prior to starting the one or more main engines;
limiting the combined thrust of said main engines used for takeoff to 90% of the said main engine rated thrust;
supplementing the thrust of said main engines with said taxi engine operating at or less than its rated thrust to thereby provide takeoff and initial climb of said aircraft from said runway; and
turning off said taxi engine after reaching a safe altitude above said runway;
whereby the combined thrust of said main engines operating at 90% of their rated thrust and the taxi engine operating at its rated thrust reduces emissions, extends engine life, reduces maintenance cost, and reduces fuel consumption of said aircraft when compared to the main engines operating at rated thrust during takeoff.

14. The method of claim 13, wherein said altitude is approximately 3000 feet.

15. The method of claim 13, further the weight of said taxi engine is less than about 600 pounds.

16. The method of claim 13, wherein said taxi engine is mounted within said tail portion in place of an auxiliary power unit, said auxiliary power unit being removed.

17. The method of claim 16, further including:
said taxi engine provides the functions of said removed auxiliary power unit system including but not limited to providing ground services for environmental cooling, engine start, power for the aircraft hydraulic system, ground system check-out, and emergency power.

18. The method of claim 13, wherein said main engines and said taxi engine are turbine engines.

19. The method of claim 13 wherein the taxi engine is located on or adjacent an aircraft front wheel, on an external surface of the aircraft fuselage between a front wheel and aircraft tail or within a tail portion of the fuselage.

20. A method of efficiently operating an aircraft having wing-mounted main engines configured to power said aircraft during takeoff and flight, the method comprising the steps of:
providing a taxi engine having a rated thrust limited to a thrust required to initiate movement of said aircraft on the ground without use of said main engines, said rated thrust being less than 15% of the total rated thrust of the one or more flight engines and wherein the rated thrust of the taxi engine is less than 33% of the total rated thrust of one of the one or more flight engines, said taxi engine providing the sole power to move said aircraft between two ground locations,
said taxi engine mounted in or on the tail portion of the fuselage of said aircraft.

21. The method of claim 20, further including the steps of:
limiting the thrust of said main engines to 90% of the rated thrust for takeoff of said aircraft;
supplementing the thrust of said main engines with the taxi engine operating at or less than its rated thrust to provide thrust for takeoff and initial climb of said aircraft from said runway; and
turning off said taxi engine after reaching a safe altitude above said runway;
the combined operation of said main engines and taxi engine thereby reducing emissions, extending engine life, reducing maintenance cost, and reducing fuel consumption of said aircraft.

22. The method of claim 20, wherein said altitude is approximately 3000 feet.

23. The method of claim 20, further including the step of retrofitting said aircraft to include said secondary engine within said tail portion.

24. The method of claim 20, wherein said main engines and said taxi engine are turbine engines and further including the step of;
eliminating an auxiliary power unit system; and
using said taxi engine to provide the functions of said auxiliary power unit system including but not limited to providing ground services for environmental cooling, engine start, power for operation of hydraulics, ground system check-out, and emergency power.

25. The method of claim 24, wherein:
said taxi thrust is less than 15% of said total main engine thrust; and
said taxi engine weight is less than 10% of said total main engine weight.

* * * * *

UNITED STATES PATENT AND TRADEMARK OFFICE
CERTIFICATE OF CORRECTION

| | | |
|---|---|---|
| PATENT NO. | : 8,109,464 B2 | Page 1 of 1 |
| APPLICATION NO. | : 13/157239 | |
| DATED | : February 7, 2012 | |
| INVENTOR(S) | : Brij B. Bhargava | |

It is certified that error appears in the above-identified patent and that said Letters Patent is hereby corrected as shown below:

In the claims:  Claim 1, col. 12, line 37, please delete the word "maximum"

Signed and Sealed this
Third Day of April, 2012

David J. Kappos
*Director of the United States Patent and Trademark Office*